United States Patent
Kim et al.

(10) Patent No.: US 7,948,597 B2
(45) Date of Patent: May 24, 2011

(54) LIQUID CRYSTAL DISPLAY PANEL FOR LIQUID CRYSTAL DISPLAY

(75) Inventors: Hee-Seop Kim, Gyeonggi-do (KR);
Jun-Woo Lee, Gyeonggi-do (KR);
Jiangang Lu, Gyeonggi-do (KR);
Eun-Hee Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 574 days.

(21) Appl. No.: 11/657,238

(22) Filed: Jan. 24, 2007

(65) Prior Publication Data
US 2007/0182904 A1    Aug. 9, 2007

(30) Foreign Application Priority Data

Feb. 7, 2006    (KR) .................. 10-2006-0011689

(51) Int. Cl.
*G02F 1/1343* (2006.01)
*G02F 1/1337* (2006.01)

(52) U.S. Cl. ........................... 349/146; 349/129

(58) Field of Classification Search .................. 349/129, 349/146
See application file for complete search history.

(56) References Cited

U.S. PATENT DOCUMENTS

| | | | |
|---|---|---|---|
| 2003/0053020 A1* | 3/2003 | Okada et al. | 349/139 |
| 2005/0030459 A1* | 2/2005 | Song et al. | 349/129 |
| 2005/0128412 A1* | 6/2005 | Lee | 349/143 |
| 2006/0146242 A1* | 7/2006 | Kim et al. | 349/129 |

* cited by examiner

*Primary Examiner* — Nathanael R Briggs
(74) *Attorney, Agent, or Firm* — Innovation Counsel LLP

(57) ABSTRACT

A liquid crystal display panel having improved optical transmissivity and viewing angle includes a first substrate, a second substrate and a liquid crystal layer. The first substrate includes a first base substrate, a plurality of gate lines and a plurality of data lines, and a pixel electrode. The gate lines and the data lines are disposed on the first base substrate and cross each other. The pixel electrode includes a first pixel electrode part and a second pixel electrode part disposed on the first base substrate and inclined in a different direction from each other with respect to the gate lines. The second substrate includes a second base substrate and a common electrode disposed on the second base substrate and alternately positioned with the pixel electrode.

20 Claims, 9 Drawing Sheets

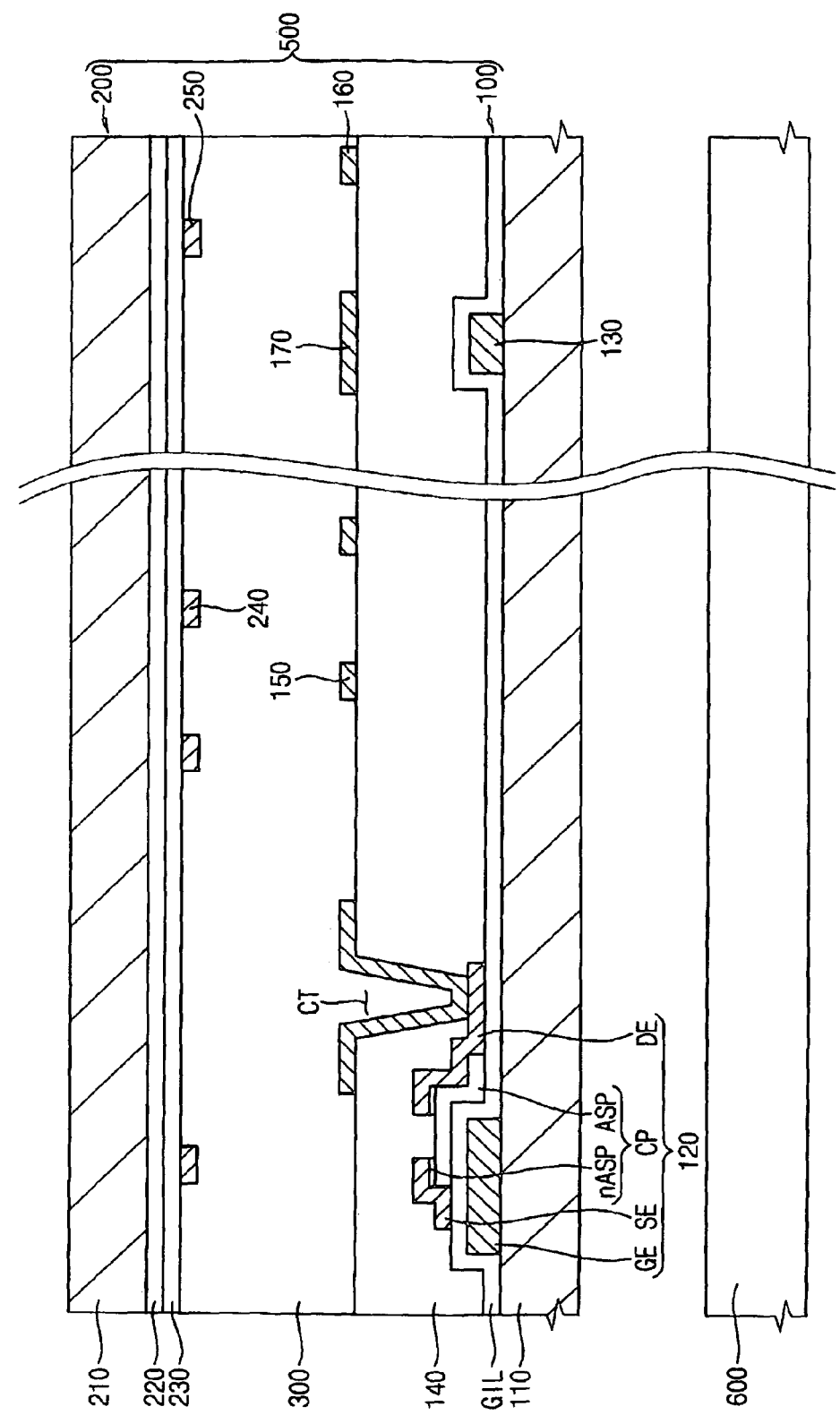

LIQUID CRYSTAL DISPLAY PANEL FOR LIQUID CRYSTAL DISPLAY

CROSS-REFERENCE TO RELATED APPLICATIONS

This application relies for priority upon Korean Patent Application No. 2006-11689 filed on Feb. 7, 2006, the contents of which are herein incorporated by reference.

FIELD OF THE INVENTION

The present invention relates to a liquid crystal display panel for a liquid crystal display.

DESCRIPTION OF THE RELATED ART

The liquid crystal display (LCD) device is widely used because of its various advantages such as a lightweight, a thinness, low driving voltage and low power consumption. The LCD panel includes a plurality of thin film transistors (TFTs) each switching a pixel, an array substrate on which the TFTs are formed, a counter substrate on which a common electrode layer is formed and a liquid crystal layer disposed between the array substrate and counter substrate whose optical transmissivity changes in response to the electrical signals applied to the pixels. The LCD panel displays an image using light passing through a portion that is not shielded by the liquid crystal molecules of the liquid crystal layer. Thus, the LCD has a narrow viewing angle when compared with the other display devices such as the cathode ray tube (CRT) display device.

In order to overcome the above problems, various methods such as the in-plane switching (IPS) mode, the vertical alignment (VA) mode, etc. have been developed. In the IPS mode, an electric field of horizontal direction is applied to the liquid crystal layer to twist the liquid crystal direction in a plane substantially parallel with an alignment layer. In the VA mode, a vertical alignment layer and a liquid crystal having a negative dielectric anisotropy are used. However, it is difficult to improve both the optical transmissivity and the viewing angle in the above modes. Thus, an alternative method capable of improving both an optical transmissivity and a viewing angle in the above modes is required.

SUMMARY OF THE INVENTION

The present invention provides a liquid crystal display panel having improved optical transmissivity and viewing angle. In one aspect of the present invention, a liquid crystal display panel includes a first substrate, a second substrate and a liquid crystal layer. The first substrate includes a first base substrate, a plurality of gate lines and a plurality of data lines, and a pixel electrode. The gate lines and the data lines are disposed on the first base substrate and cross each other. The pixel electrode includes a first pixel electrode part and a second pixel electrode part disposed on the first base substrate and inclined in different directions from each other with respect to the gate lines. The second substrate includes a second base substrate and a common electrode disposed on the second base substrate and alternately positioned with the pixel electrode. The first substrate may further include a lower electrode for a capacitor disposed on the first base substrate and positioned between consecutive gate lines. The lower electrode is substantially in parallel with the gate lines and crosses the data lines.

For example, the first pixel electrode part and the second pixel electrode part are symmetrical to each other with respect to the lower electrode. The pixel electrode covers at least a portion of the lower electrode.

The pixel electrode may further include a third pixel electrode part positioned between the first pixel electrode part and the second pixel electrode part, and the third pixel electrode part and the lower electrode form a storage capacitor. The third pixel electrode part may have a different width along a direction in which the gate lines extend. For example, the third pixel electrode part has a wedge shape.

In an exemplary embodiment, the first pixel electrode part includes a plurality of first extension portions extending to be inclined at a first angle with respect to the gate lines and a first connection portion connecting the first extension portions, and the second pixel electrode part includes a plurality of second extension portions extending to be inclined at a second angle with respect to the gate lines and a second connection portion connecting the second extension portions. For example, the first angle is in a range of about −5 degrees to about −30 degrees, and the second angle is in a range of about 5 degrees to about 30 degrees.

In an exemplary embodiment, the common electrode may include a first common electrode part and a second common electrode part. The first common electrode part includes a plurality of third extension portions extending to be inclined at the first angle with respect to the gate lines and a third connection portion connecting the third extension portions. The second common electrode part includes a plurality of fourth extension portions extending to be inclined at the second angle with respect to the gate lines and a fourth connection portion connecting the fourth extension portions. The first common electrode part and the second common electrode part may overlap the gate lines. The third extension portion of the first common electrode part and the fourth extension portion of the second common electrode part may correspond to the data lines.

The common electrode may further include a third common electrode part corresponding to the gate lines and positioned between the first common electrode part and the second common electrode part. The third common electrode part may have a different width along a direction in which the gate lines extend. For example, the third common electrode part has a wedge shape.

In another aspect of the present invention, a liquid crystal display panel includes a first base substrate, a plurality of gate lines, a plurality of data lines, a lower electrode for a capacitor, an insulation layer, a pixel electrode, a second base substrate, a common electrode and a liquid crystal layer. The gate lines are disposed on the first base substrate and extend in a first direction. The data lines are disposed on the first base substrate to cross the gate lines and extend in a second direction. The lower electrode is disposed on the first base substrate, and positioned between consecutive gate lines. The insulation layer is formed on the gate lines, the data lines and the lower electrode. The pixel electrode is disposed on the insulation layer and includes a first pixel electrode part and a second pixel electrode part inclined in a different direction from each other with respect to the gate lines. The second base substrate faces the first base substrate. The common electrode is disposed on the second base substrate and includes a first common electrode part and a second common electrode part alternately positioned with the pixel electrode. The liquid crystal layer is disposed between the first and second base substrates.

In still another aspect of the present invention, a method of making a liquid crystal display panel is provided as follows.

A signal-applying module is formed on a first base substrate, the signal-applying module including an output terminal configured to output a data signal. An insulation layer is formed to cover the signal-applying module. A contact hole is formed through the insulation layer, a portion of the output terminal being exposed through the contact hole. A pixel electrode is formed on the first base substrate, the pixel electrode including a first pixel electrode part and a second pixel electrode part inclined in a different direction from each other with respect to the gate lines. A common electrode is formed on a second base substrate, the common electrode including a first common electrode part and a second common electrode part alternately positioned with the pixel electrode. Liquid crystal is injected into between the first base substrate and the second base substrate to form a liquid crystal layer.

In an exemplary embodiment, the signal-applying module may be formed as follows. A plurality of gate lines extending in a first direction, a gate electrode and a lower electrode for a capacitor positioned between consecutive gate lines on the first base substrate are simultaneously formed. A gate insulation layer is formed on the first base substrate having the gate lines, the gate electrode and the lower electrode. A channel pattern is formed on the first base substrate having the gate insulation layer. A source electrode, a drain electrode and a plurality of data lines crossing the gate lines and extending in a second direction is simultaneously formed on the first base substrate having the channel pattern.

In still another aspect of the present invention, a liquid crystal display device includes a liquid crystal display panel and a backlight assembly. The liquid crystal display panel displays an image using light. The liquid crystal display panel includes a first substrate, a second substrate and a liquid crystal layer. The first substrate includes a first base substrate, a plurality of gate lines and a plurality of data lines, and a pixel electrode. The gate lines and the data lines are disposed on the first base substrate and cross each other. The pixel electrode includes a first pixel electrode part and a second pixel electrode part disposed on the first base substrate and inclined in a different direction from each other with respect to the gate lines. The second substrate includes a second base substrate and a common electrode disposed on the second base substrate and alternately positioned with the pixel electrode. The liquid crystal layer is disposed between the first and second substrates. The backlight assembly provides the light to the liquid crystal display panel.

According to the present invention, the pixel electrode of the first substrate is formed inclined in different directions with respect to the gate lines, and the common electrode of the second substrate is alternately formed with respect to the pixel electrode, thereby improving an optical transmissivity and a viewing angle.

BRIEF DESCRIPTION OF THE DRAWING

The above and other features and advantage points of the present invention may become more apparent from a reading of the ensuing description, together with accompanying drawings, in which:

FIG. 9 is a partial cross-sectional view illustrating a liquid crystal display device according to an exemplary embodiment of the present invention.

DESCRIPTION OF THE EMBODIMENTS

Figure 1:
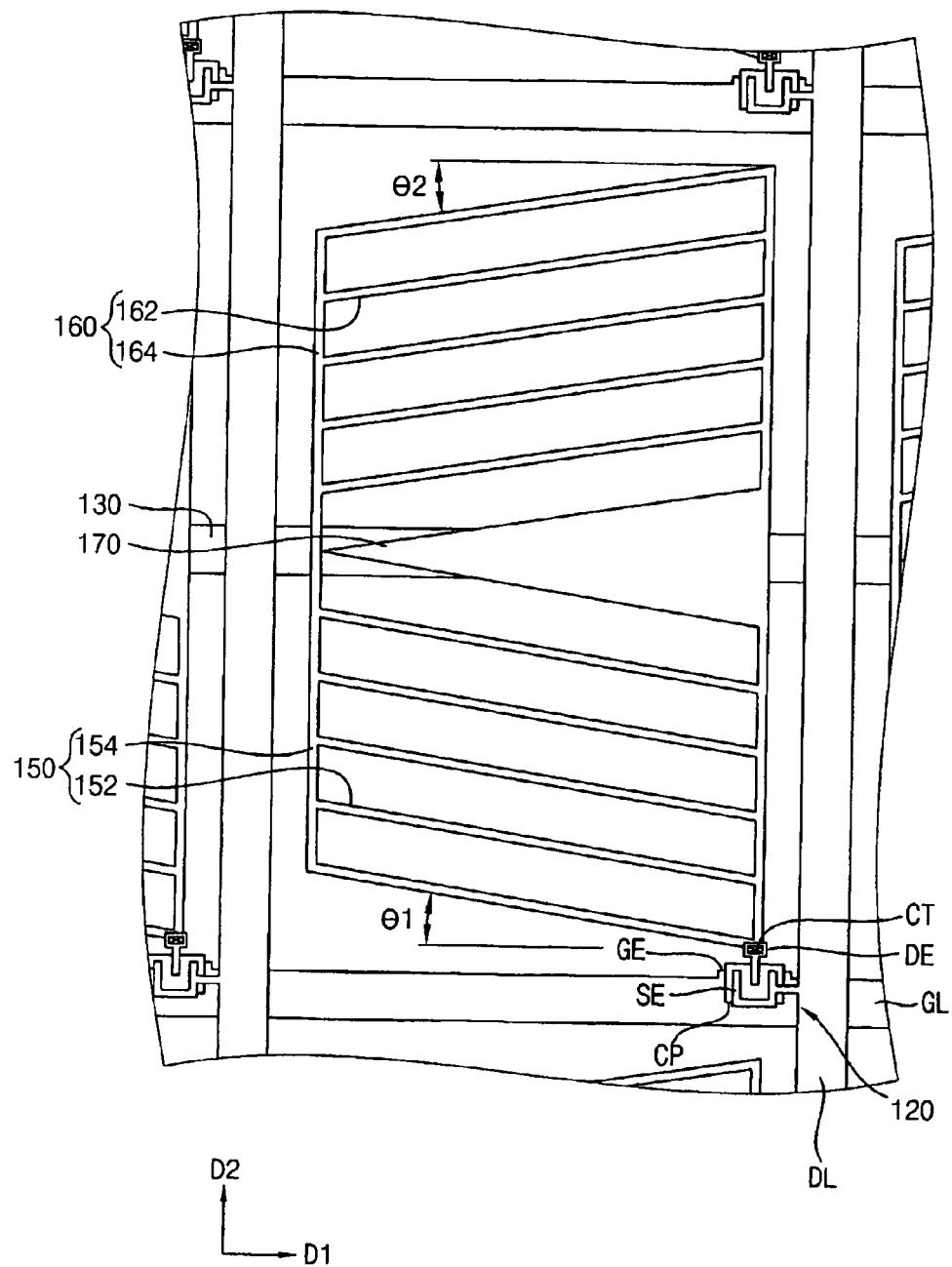
FIG. 1 is a partial plan view illustrating a portion of an array substrate of a liquid crystal display panel according to an exemplary embodiment of the present invention.

The present invention now will be described more fully hereinafter with reference to the accompanying drawings, in which embodiments of the invention are shown. It will be understood that when an element is referred to as being "on" or "onto" another element, it may be directly on the other element or intervening elements may also be present. In contrast, when an element is referred to as being "directly on" another element, there are no intervening elements present. Like reference numerals refer to similar or identical elements throughout.

Figure 2:
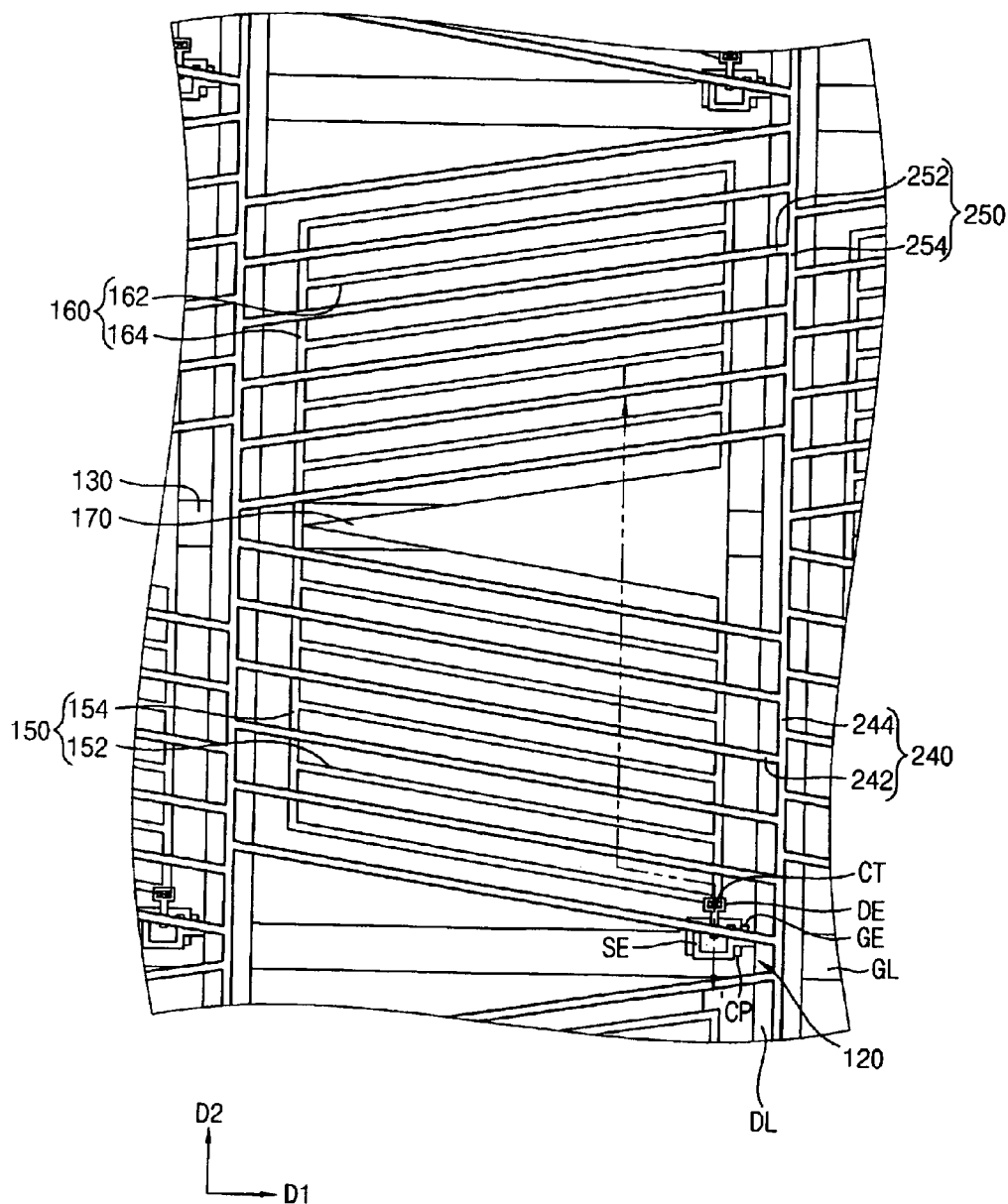
FIG. 2 is a partial plan view illustrating the array substrate and a pixel electrode of the array substrate.
Figure 3:
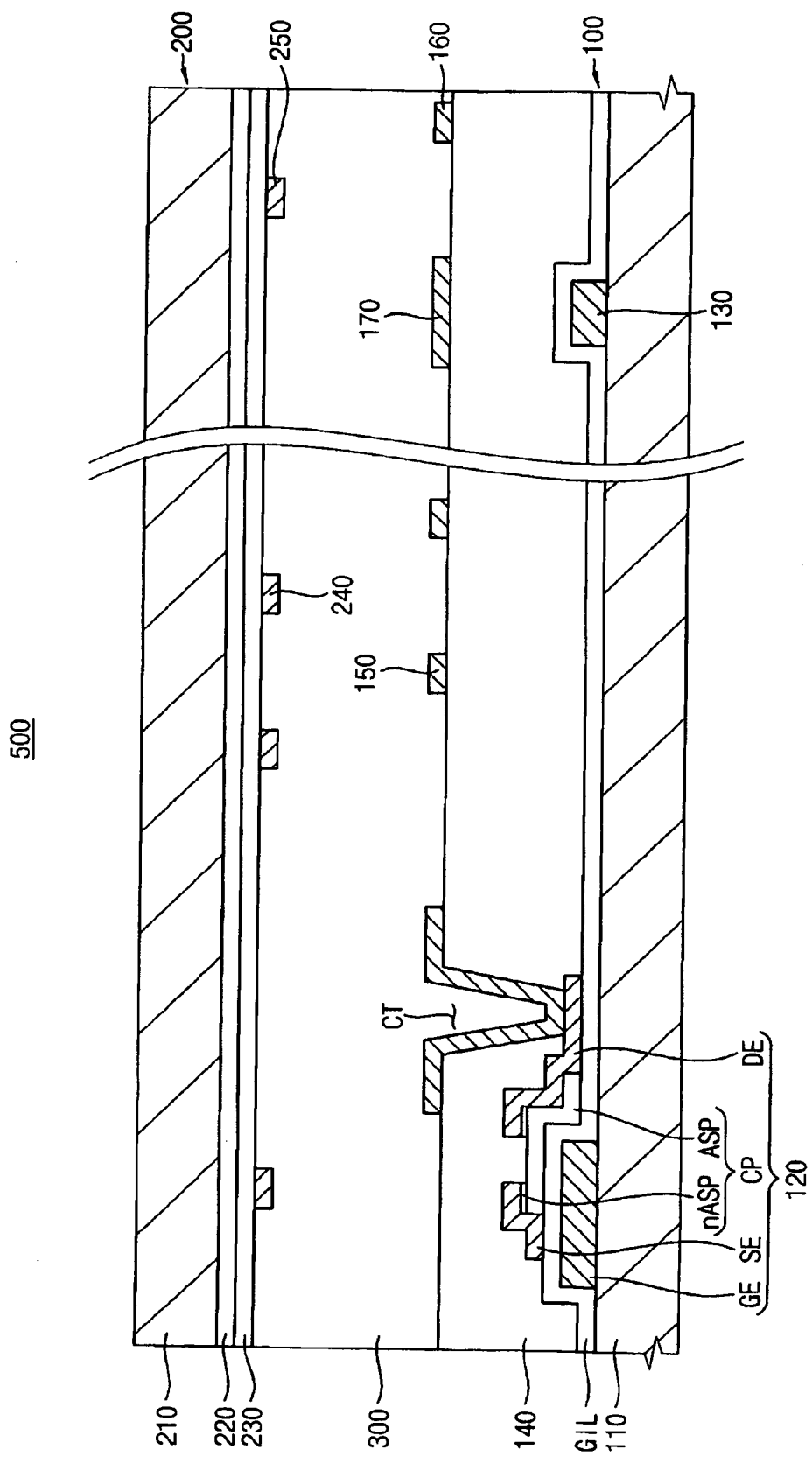
FIG. 3 is a partial cross-sectional view taken along a line I-I' in FIG. 2.

FIG. 1 is a partial plan view illustrating a portion of an array substrate of a liquid crystal display panel according to an exemplary embodiment of the present invention. FIG. 2 is a partial plan view illustrating the array substrate illustrated in FIG. 1 and a pixel electrode corresponding to the array substrate. FIG. 3 is a partial cross-sectional view taken along a line I-I' in FIG. 2.

Referring to FIGS. 1 to 3, a liquid crystal display (LCD) panel 500 includes a first substrate 100, a second substrate 200 and a liquid crystal layer 300. First substrate 100 includes a first base substrate 110, a signal-applying module 120, a lower electrode for a capacitor 130, an insulation layer 140, a first pixel electrode part 150 and a second pixel electrode part 160 and a third pixel electrode part 170.

First base substrate 110 includes a transparent substrate such as a glass substrate capable of passing light.

Signal-applying module 120 is disposed on first base substrate 110. Signal-applying module 120 outputs an image data signal externally provided via an output terminal at a predetermined time.

As shown in FIGS. 1 to 3, signal-applying module 120 includes a gate electrode GE, a gate insulation layer GIL, a channel pattern CP, a source electrode SE and a drain electrode DE that is the output terminal.

Gate electrode GE may protrude from gate line GL or may correspond to a portion of gate line GL. Source electrode SE protrudes from a data line DL to output a data signal to channel pattern CP. As shown in FIGS. 1 to 3, source electrode SE may have a U-shape.

Gate line GL extends in a first direction D1 shown in FIG. 1. Although not shown in FIG. 1, a plurality of gate lines GL are substantially parallelly arranged in a second direction D2 that is substantially perpendicular to the first direction D1. Although not shown in FIG. 1, a plurality of gate electrodes GE c protrude from each gate line GL on first base substrate 110 in a direction that is substantially in parallel with the second direction D2.

Gate insulation layer GIL covers gate line GL and gate electrode GE to insulate gate line GL from data line DL and source electrode SE. Gate insulation layer GIL may, for example, be composed of a transparent silicon nitride.

Channel pattern CP is formed on gate insulation layer GIL. Channel pattern CP is disposed on gate insulation layer GIL. Channel pattern CP includes an amorphous silicon pattern ASP and a pair of n+ amorphous silicon patterns nASP. The n+ amorphous silicon patterns nASP are disposed on the amorphous silicon pattern ASP, and spaced apart from each other.

Data line DL is disposed on gate insulation layer GIL. Data line DL crosses gate line GL and is disposed in second direction D2. Although not shown in FIGS. 1 to 3, a plurality of data lines DL is substantially parallelly arranged in the first direction D1. Although not shown in FIGS. 1 to 3, a plurality of source electrodes SE protrudes from each data line DL on first base substrate 110 in a direction that is substantially in parallel with the first direction D1. Each source electrode SE is electrically connected to one of the n+ amorphous silicon patterns nASP.

The drain electrode DE is electrically connected to the other of the n+ amorphous silicon patterns nASP. Drain electrode DE is formed simultaneously with data line DL and spaced apart from source electrode SE.

Lower electrode 130 is disposed on first base substrate 110. Lower electrode 130 is positioned between consecutive ones of gate lines GL and may be formed substantially in parallel with gate lines GL. Lower electrode 130 extends to cross the data lines DL. Gate insulation layer GIL is formed on lower electrode 130.

Insulation layer 140 is disposed on first base substrate 110 having signal-applying module 120 and lower electrode 130. A contact hole CT is formed through insulation layer 140 to expose drain electrode DE of signal-applying module 120. Insulation layer 140 includes, for example, a photosensitive material that is sensitized to light to form the contact hole.

First pixel electrode part 150, second pixel electrode part 160 and third pixel electrode part 170 are disposed on insulation layer 140. The first, second and third pixel electrode parts 150, 160 and 170 form a pixel electrode. First, second and third pixel electrode parts 150, 160 and 170 are formed within a unit pixel defined by consecutive gate lines GL and consecutive data lines DL.

Particularly, lower electrode 130 between the consecutive gate lines GL crosses the consecutive data lines DL to divide the unit pixel into two areas. The first pixel electrode part 150 and the second pixel electrode part 160 correspond to the two divided areas, respectively, and are inclined in different directions with respect to the gate lines GL. The third pixel electrode part 170 corresponds to the lower electrode 130.

First pixel electrode part 150 includes a plurality of first extension portions 152 and a first connection portion 154. The first extension portions 152 of the first pixel electrode part 150 extend to be inclined at a first angle $\theta 1$ with respect to the first direction D1. The first connection portion 154 connects the first extension portions 152.

Second pixel electrode part 160 includes a plurality of second extension portions 162 and a second connection portion 164. The second extension portions 162 of the second pixel electrode part 160 extend to be inclined at a second angle $\theta 2$ with respect to the first direction D1. The second connection portion 164 connects the second extension portions 162.

As shown in FIG. 1, the first extension portions 152 of the first pixel electrode part 150 are inclined in a different direction from the second extension portions 162 of the second pixel electrode part 160. For example, the first angle $\theta 1$ is in a range of about −5 degrees to about −30 degrees, and the second angle $\theta 2$ is in a range of about 5 degrees to about 30 degrees.

In one embodiment, the first pixel electrode part 150 and the second pixel electrode part 160 may be symmetrical to each other with respect to the lower electrode 130.

Third pixel electrode part 170 is positioned between the first and second pixel electrode parts 150 and 160. The third pixel electrode part 170 covers at least a portion of the lower electrode 130. The third pixel electrode part 170 and the lower electrode 130 corresponding to the third pixel electrode part 170 may form a capacitor, and the capacitor serves as a storage capacitor.

Since the first and second pixel electrode parts 150 and 160 are inclined in a different direction from each other, the third pixel electrode part 170 corresponding to the lower electrode 130 may include an inclined portion at the first angle $\theta 1$ and another inclined portion at the second angle $\theta 2$.

When the third pixel electrode part 170 has a similar shape to the first and second pixel electrode parts 150 and 160, an opening may be formed in the third pixel electrode part 170. Thus, the third pixel electrode part 170 may have a different width along a direction in which gate line GL extends, so as to prevent a decrease in an area of the third pixel electrode part 170. For example, the third pixel electrode part 170 may have a wedge shape such that the width of the third pixel electrode part 170 may be gradually thicker from one end to the other end of the third pixel electrode part 170 thereby preventing the capacitance of the storage capacitor defined by the third pixel electrode part 170 and the lower electrode 130 from being reduced. Further, the third pixel electrode part 170 may be formed substantially in parallel with a common electrode that will be described later to increase optical transmissivity and prevent the appearance of texture in the display.

Referring again to FIGS. 2 and 3, second substrate 200 is disposed over first substrate 100. Second substrate 200 includes a second base substrate 210, a color filter layer 220, a first common electrode part 240 and a second common electrode part 250. Second substrate 200 optionally includes a protective layer 230.

The second base substrate 210 includes a transparent substrate such as a glass substrate capable of passing light.

Color filter layer 220 is disposed on the second base substrate 210. Color filter layer 220 includes, for example, a red color filter for passing red light of white light, a green color filter for passing green light of white light, and a blue color filter for passing blue light of white light.

Protective layer 230 is disposed on the color filter layer 220 to protect the color filter layer 220.

First common electrode part 240 and the second common electrode part 250 are disposed on protective layer 230. The first and second common electrode parts 240 and 250 form a common electrode. The common electrode is alternately positioned with respect to the pixel electrode.

First and second common electrode parts 240 and 250 are formed within the unit pixel defined by the consecutive gate lines GL and the consecutive data lines DL.

Particularly, lower electrode 130 between consecutive gate lines GL crosses the consecutive data lines DL to divide the unit pixel into two areas. First common electrode part 240 and the second common electrode part 250 correspond to the two divided areas, respectively.

First common electrode part 240 includes a plurality of third extension portions 242 and a third connection portion 244. The third extension portions 242 of the first common electrode part 240 extend to be inclined at the first angle $\theta 1$ with respect to the first direction D1. Thus, the third extension portions 242 of the first common electrode part 240 are substantially in parallel with the first extension portions 152 of the first pixel electrode part 150. The third connection portion 244 connects the third extension portions 242.

Second common electrode part 250 includes a plurality of fourth extension portions 252 and a fourth connection portion 254. The fourth extension portions 252 of the second common electrode part 250 extend to be inclined at the second angle θ2 with respect to the first direction D1. Thus, the fourth extension portions 252 of the second common electrode part 250 are substantially in parallel with the second extension portions 162 of the second pixel electrode part 160. The fourth connection portion 254 connects the fourth extension portions 252.

As shown in FIG. 2, since the third extension portions 242 of the first common electrode part 240 are substantially in parallel with the first extension portions 152 of the first pixel electrode part 150 and the fourth extension portions 252 of the second common electrode part 250 are substantially in parallel with the second extension portions 162 of the second pixel electrode part 160, the third extension portions 242 of the first common electrode part 240 are inclined in a different direction from the fourth extension portions 252 of the second common electrode part 250. For example, the first angle θ1 is in a range of about −5 degrees to about −30 degrees, and the second angle θ2 is in a range of about 5 degrees to about 30 degrees.

In one embodiment, the first common electrode part 240 and the second common electrode part 250 may be symmetrical to each other with respect to the lower electrode 130.

The third connection portion 244 of the first common electrode part 240 and the fourth connection portion 254 of the second common electrode part 250 are disposed corresponding to the data line DL.

As shown in FIG. 2, the pixel electrode defined by the first, second and third pixel electrode parts 150, 160 and 170 does not overlap gate line GL. In contrast, the first common electrode part 240 and the second common electrode part 250 do overlap gate line GL thereby preventing an increase in a parasite capacitance between gate line GL and the pixel electrode and also preventing an increase in kick-back voltage that is in proportion to the parasite capacitance.

The third connection portion 244 of the first common electrode part 240 and the fourth connection portion 254 of the second common electrode part 250 are formed corresponding to the data line DL, and connected to each other at a position corresponding to the lower electrode 130.

The third extension portions 242 of the first common electrode part 240 in one unit pixel protrudes from the third connection portion 244 of the first common electrode part 240 of the adjacent unit pixel. The fourth extension portions 252 of the second common electrode part 250 in one unit pixel protrudes from the fourth connection portion 254 of the second common electrode part 250 of the adjacent unit pixel.

As described above, the first and second common electrode parts 240 and 250 are electrically connected to each other, and may be also electrically connected to the adjacent first and second common electrode parts 240 and 250.

Referring again to FIG. 3, the liquid crystal layer 300 is disposed between first substrate 100 and second substrate 200.

Although not shown in FIG. 3, an alignment layer may be formed on first substrate 100 and/or second substrate 200 to align liquid crystal molecules of the liquid crystal layer 300 in a predetermined direction.

In FIGS. 1 to 3, when the liquid crystal molecules correspond to a positive type, a surface of the alignment layer may be rubbed in the first direction D1. Alternatively, when the liquid crystal molecules correspond to a negative type, the surface of the alignment layer may be rubbed in the second direction D2.

When the liquid crystal molecules correspond to a positive type, an electric field generated between the pixel electrode and the common electrode rearranges the liquid crystal molecules, which is previously arranged to be inclined at the first angle θ1 or the second angle θ2 with respect to the pixel electrode and the common electrode by the above described rubbing, along a direction in which electric force acts.

When the liquid crystal molecules correspond to a negative type, an electric field generated between the pixel electrode and the common electrode rearranges the liquid crystal molecules, which is previously arranged to be inclined at the first angle θ1 or the second angle θ2 with respect to a direction substantially perpendicular to the pixel electrode and the common electrode by the above described rubbing, along an equipotential line.

As described above, since the liquid crystal molecules may be rearranged on the common electrode as well as the pixel electrode, the aperture ratio may be increased. Further, since the liquid crystal molecules rotate in the same direction at both the position corresponding to the first pixel electrode part 150 and the position corresponding to the second pixel electrode part 160, the appearance of texture may be prevented within the unit pixel.

When an electric field generated between the pixel electrode and the common electrode rearranges the liquid crystal molecules along a predetermined direction, most of the liquid crystal molecules may rotate on substantially the same plane to thereby improving a viewing angle.

Figure 4:
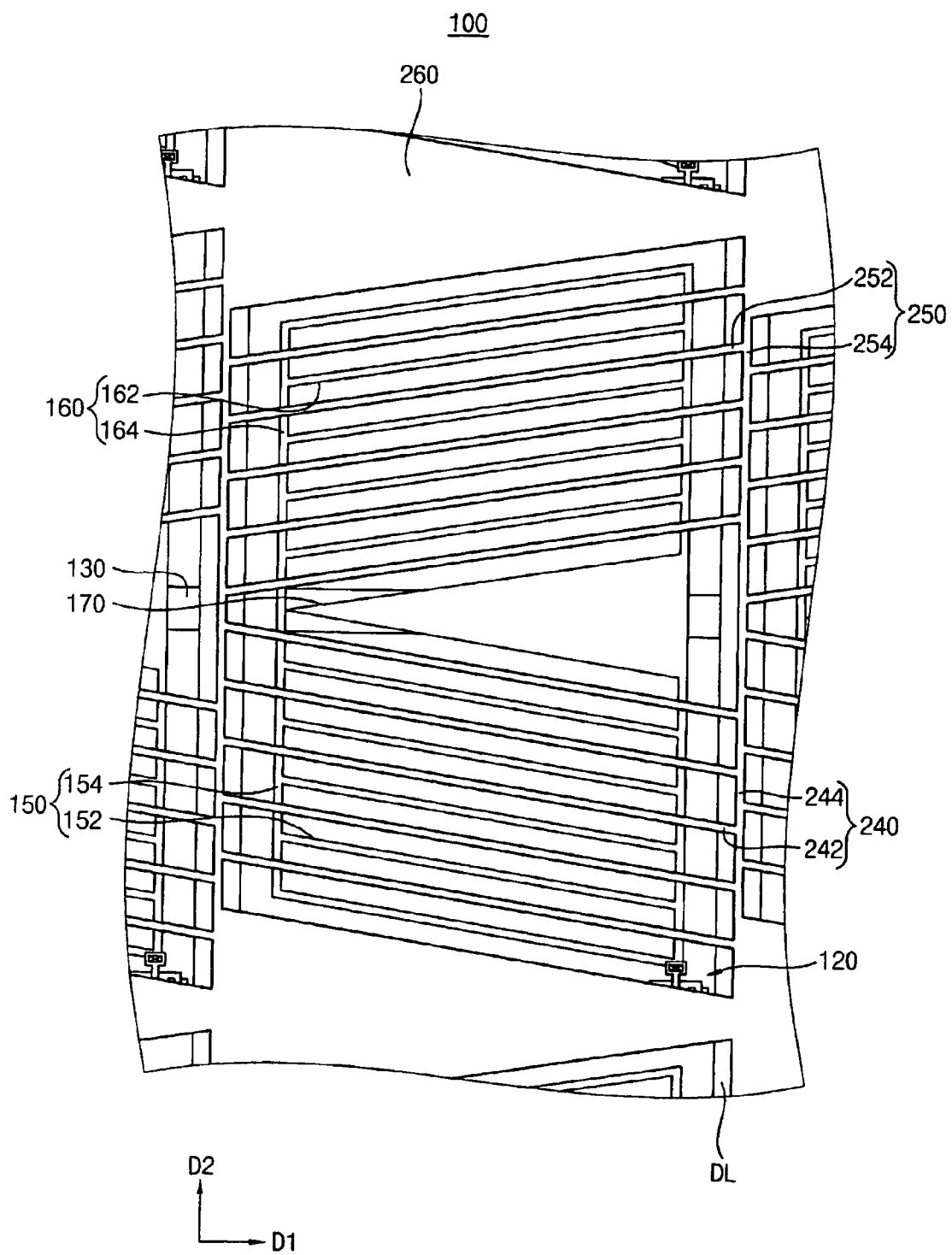
FIG. 4 is a partial plan view illustrating a portion of a liquid crystal display panel according to another exemplary embodiment of the present invention.

FIG. 4 is a partial plan view illustrating a portion of a liquid crystal display panel according to another exemplary embodiment of the present invention. Referring to FIG. 4, second substrate 200 further includes a third common electrode part 260. The third common electrode part 260 corresponds to gate line GL. The third common electrode part 260 is positioned between the first and second common electrode parts 240 and 250.

Since the first and second common electrode parts 240 and 250 are inclined in a different direction from each other, the third common electrode part 260 corresponding to gate line GL may include an inclined portion at the first angle θ1 and another inclined portion at the second angle θ2.

When the third common electrode part 260 has a similar shape to the first and second common electrode parts 240 and 250, an opening may be formed in the third common electrode part 260. Thus, the third common electrode part 260 may have a different width along the direction in which gate line GL extends, so as to prevent a decrease in an area of the third common electrode part 260. For example, the third common electrode part 260 may have a wedge shape such that the width of the third common electrode part 260 may be gradually thicker from one end to the other end of the third common electrode part 260. As a result, an electrical resistance of the third common electrode part 260 may be prevented. Further, the third common electrode part 260 may be formed substantially in parallel with the pixel electrode to increase an optical transmissivity and prevent texture.

FIGS. 5 to 8 are partial plan views illustrating a method of manufacturing a liquid crystal display panel according to an exemplary embodiment of the present invention.

Figure 5:
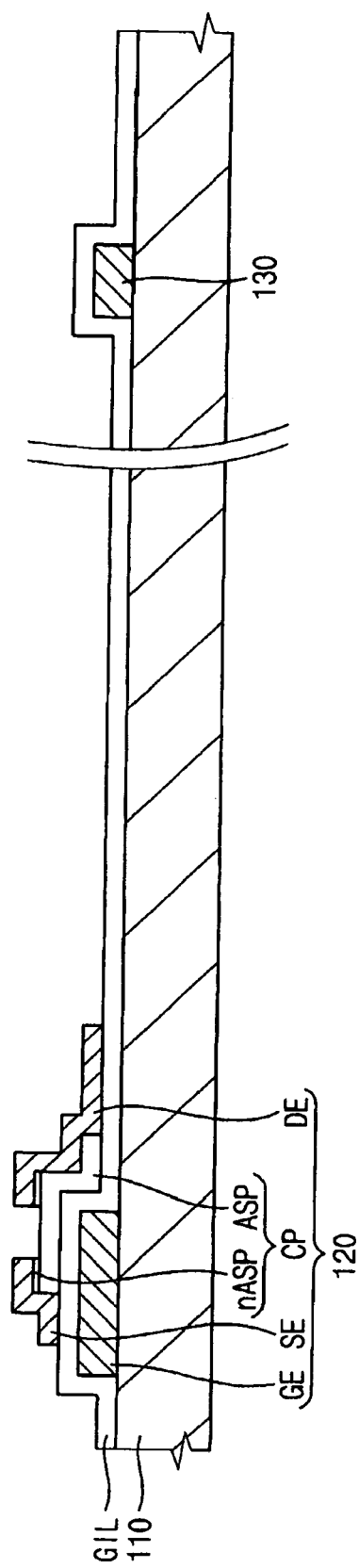
FIGS. 5 to 8 are partial plan views illustrating a method of manufacturing a liquid crystal display panel according to an exemplary embodiment of the present invention.

Referring to FIG. 5, in order to manufacture first substrate 100, first, signal-applying module 120 is formed on first base substrate 110. Signal-applying module 120 includes the output terminal outputting the data signal.

Particularly, gate lines GL extending in the first direction D1 shown in FIG. 2 and gate electrode GE are formed on first base substrate 110. The lower electrode 130 positioned between the consecutive gate lines GL is simultaneously formed with the gate lines GL and gate electrode GE.

Then, the gate insulation layer GIL is formed on first base substrate 110 having the gate lines GL, gate electrode GE and the lower electrode 130.

Then, the channel pattern CP including the amorphous silicon pattern ASP and the pair of n+ amorphous silicon patterns nASP is formed on first base substrate 110 having the gate insulation layer GIL.

Thereafter, the source electrode SE, the drain electrode DE and the data lines DL that cross the gate lines GL and extend in the second direction D2 shown in FIG. 2 are simultaneously formed on first base substrate 110 having the channel pattern CP.

Figure 6:
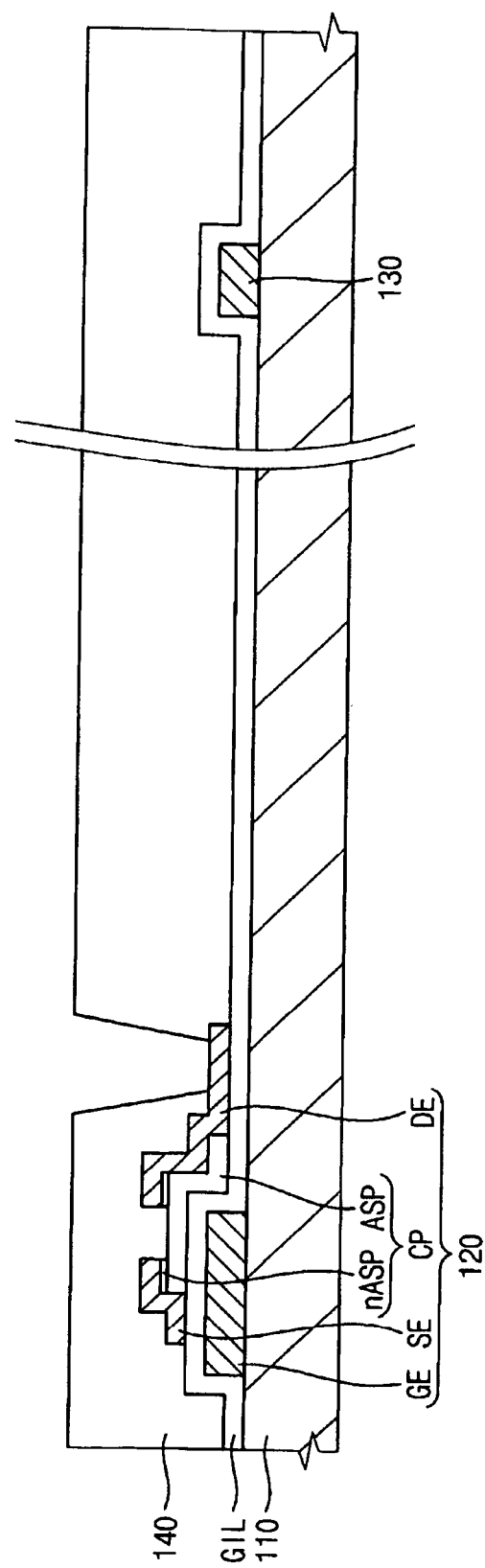

Referring to FIG. 6, the thick insulation layer 140 is formed on first base substrate 110 having signal-applying module 120. The insulation layer 140 includes, for example, an organic layer having photosensitive material that is sensitized to light.

The insulation layer 140 is patterned by light passing through a predetermined mask. Thus, a contact hole exposing a portion of the drain electrode DE of signal-applying module 120 is formed through the insulation layer 140.

Figure 7:
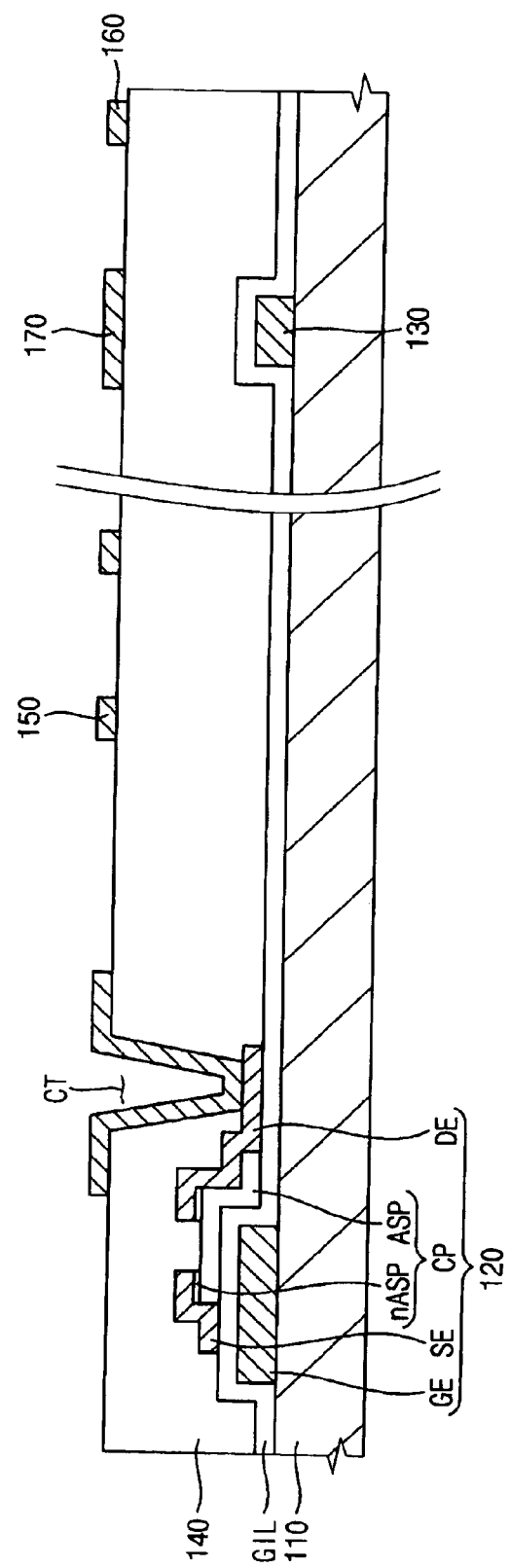

Referring to FIG. 7, the pixel electrode including the first pixel electrode part 150 and the second pixel electrode part 160 inclined in a different direction from the first pixel electrode part 150 is formed on first base substrate 110 on which the insulation layer 140 having the contact hole is formed.

The wedge-shaped third pixel electrode part 170 positioned between the first and second pixel electrode parts 150 and 160 may be simultaneously formed with the first and second pixel electrode parts 150 and 160. The third pixel electrode part 170 and the lower electrode 130 form a storage capacitor.

Second substrate 200 is formed through a separate process from the manufacturing process of first substrate 100.

Figure 8:
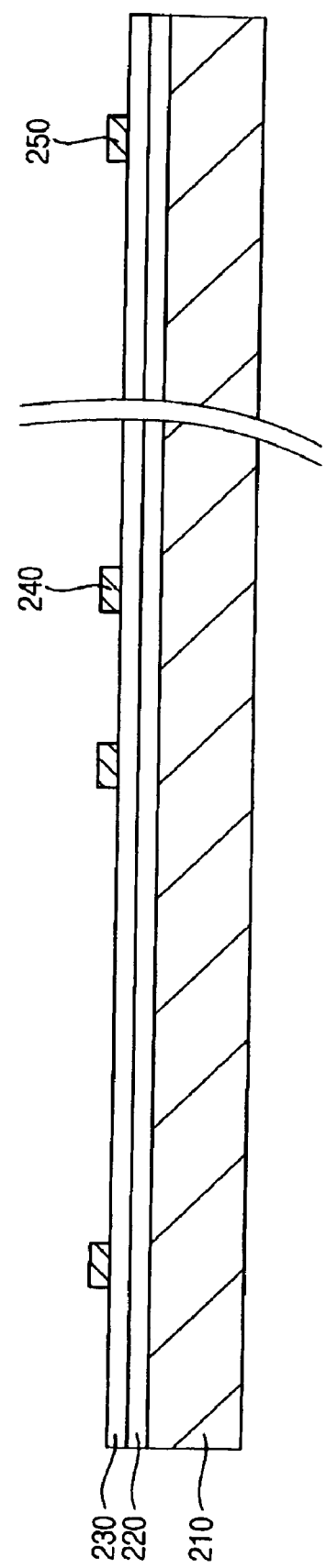

Referring to FIG. 8, in order to manufacture second substrate 200, first, the color filter layer 220 and the protective layer 230 are successively formed on the second base substrate 210.

Then, the common electrode alternately positioned with the pixel electrode is formed on the second base substrate 210 having the color filter layer 220 and the protective layer 230. The common electrode includes the first common electrode part 240 and the second common electrode part 250.

The wedge-shaped third common electrode part 260 (refer to FIG. 4) positioned between the first and second common electrode parts 240 and 250 may be simultaneously formed with the first and second common electrode parts 240 and 250.

Thereafter, although not shown in FIG. 8, after the first and second substrates 100 and 200 are manufactured, liquid crystal is injected into between the first and second substrates 100 and 200 to thereby form the liquid crystal layer 300. Thus, the LCD panel 500 in FIGS. 2 and 3 is completely manufactured.

FIG. 9 is a partial cross-sectional view illustrating a liquid crystal display device according to an exemplary embodiment of the present invention.

Referring to FIG. 9, an LCD device 700 includes an LCD panel 500 and a backlight assembly 600.

The LCD panel 500 includes a first substrate 100, a second substrate 200 and a liquid crystal layer 300. The LCD panel 500 is substantially the same as the LCD panel 500 illustrated in FIGS. 2 and 3. Thus, any further description will be omitted.

The backlight assembly 600 provides light to the LCD panel 500. The LCD device 700 displays an image using the light provided from the backlight assembly 600. Alternatively, the LCD device 700 may display an image using light externally provided.

According to the present invention, a first substrate for an LCD panel includes a pixel electrode having a first pixel electrode part and a second pixel electrode part, which are inclined in a different direction from each other with respect to gate lines, and a second substrate for an LCD panel includes a common electrode alternately positioned with the pixel electrode, thereby improving an optical transmissivity and a viewing angle.

In addition, a wedge-shaped third pixel electrode part between the first and second pixel electrode parts is formed corresponding to a lower electrode for a capacitor, so that a decrease in a capacitance of a storage capacitor may be prevented. Further, the third pixel electrode part is formed substantially in parallel with the common electrode, thereby improving an optical transmissivity and preventing texture.

In addition, the common electrode is formed to overlap the gate lines, so that an increase in a parasite capacitance between the gate lines and the pixel electrode may be prevented, and an increase in a kick back voltage may also be prevented.

In addition, the common electrode has a wedge shape at an overlapped portion with the gate lines, and thus electrical resistance of the common electrode may be reduced. Further, the common electrode is formed substantially in parallel with the pixel electrode, thereby improving an optical transmissivity and preventing texture.

Although exemplary embodiments of the present invention have been described, it is understood that various changes and modifications can be made by those of ordinary skill in the art without, however, departing from the spirit and scope of the present invention.

What is claimed is:

1. A liquid crystal display panel comprising:
   a first base substrate;
   a plurality of gate lines and a plurality of data lines disposed on the first base substrate and crossing each other; and
   a pixel electrode comprising a first pixel electrode part and a second pixel electrode part disposed on the first base substrate and inclined in a different direction from each other with respect to the gate lines;
   a second base substrate;
   a common electrode including a first common electrode part and a second common electrode part, disposed on the second base substrate, and alternately positioned with the pixel electrode; and
   a liquid crystal layer disposed between the first and second substrates,
   wherein the first pixel electrode part includes a plurality of first extension portions extending to be inclined at a first angle with respect to the gate lines and a first connection portion connecting the first extension portions,
   the second pixel electrode part includes a plurality of second extension portions extending to be inclined at a second angle with respect to the gate lines and a second connection portion connecting the second extension portions,
   the first common electrode part includes a plurality of third extension portions extending to be inclined at the first angle with respect to the gate lines and a third connection portion connecting the third extension portions,
   the second common electrode part includes a plurality of fourth extension portions extending to be inclined at the second angle with respect to the gate lines and a fourth connection portion connecting the fourth extension portions, the first to fourth extension portions do not overlap with each other, and each of the first and second extension portions and each of the first and second connection portions have a linear shape.

2. The liquid crystal display panel of claim 1, wherein the first substrate further comprises a lower electrode for a capacitor disposed on the first base substrate and positioned between consecutive gate lines.

3. The liquid crystal display panel of claim 2, wherein the lower electrode is substantially in parallel with the gate lines and crosses the data lines.

4. The liquid crystal display panel of claim 3, wherein the first pixel electrode part and the second pixel electrode part are symmetrical to each other with respect to the lower electrode.

5. The liquid crystal display panel of claim 2, wherein the pixel electrode covers at least a portion of the lower electrode.

6. The liquid crystal display panel of claim 2, wherein the pixel electrode further comprises a third pixel electrode part positioned between the first pixel electrode part and the second pixel electrode part, and the third pixel electrode part and the lower electrode form a storage capacitor.

7. The liquid crystal display panel of claim 6, wherein the third pixel electrode part has a different width along a direction in which the gate lines extend.

8. The liquid crystal display panel of claim 7, wherein the third pixel electrode part has a wedge shape.

9. The liquid crystal display panel of claim 1, wherein the first angle is in a range of about −5 degrees to about −30 degrees, and the second angle is in a range of about 5 degrees to about 30 degrees.

10. The liquid crystal display panel of claim 1, wherein the first common electrode part and the second common electrode part overlap the gate lines.

11. The liquid crystal display panel of claim 1, wherein the third extension portion of the first common electrode part and the fourth extension portion of the second common electrode part correspond to the data lines.

12. The liquid crystal display panel of claim 1, wherein the common electrode further comprises a third common electrode part corresponding to the gate lines and positioned between the first common electrode part and the second common electrode part.

13. The liquid crystal display panel of claim 12, wherein the third common electrode part has a different width along a direction in which the gate lines extend.

14. The liquid crystal display panel of claim 13, wherein the third common electrode part has a wedge shape.

15. A liquid crystal display panel comprising:
a first base substrate;
a plurality of gate lines disposed on the first base substrate and extending in a first direction;
a plurality of data lines disposed on the first base substrate to cross the gate lines and extending in a second direction;
a lower electrode for a capacitor disposed on the first base substrate, and positioned between consecutive gate lines;
an insulation layer formed on the gate lines, the data lines and the lower electrode;
a pixel electrode disposed on the insulation layer and comprising a first pixel electrode part and a second pixel electrode part inclined in a different direction from each other with respect to the gate lines;
a second base substrate facing the first base substrate;
a common electrode disposed on the second base substrate and comprising a first common electrode part and a second common electrode part alternately positioned with the pixel electrode; and
a liquid crystal layer disposed between the first and second base substrates,
wherein the first pixel electrode part includes a plurality of first extension portions extending to be inclined at a first angle with respect to the gate lines and a first connection portion connecting the first extension portions,
the second pixel electrode part includes a plurality of second extension portions extending to be inclined at a second angle with respect to the gate lines and a second connection portion connecting the second extension portions,
the first common electrode part includes a plurality of third extension portions extending to be inclined at the first angle with respect to the gate lines and a third connection portion connecting the third extension portions,
the second common electrode part includes a plurality of fourth extension portions extending to be inclined at the second angle with respect to the gate lines and a fourth connection portion connecting the fourth extension portions,
the first to fourth extension portions do not overlap with each other,
each of the first and second extension portions and each of the first and second connection portions have a linear shape.

16. The liquid crystal display panel of claim 15, wherein the pixel electrode further comprises a third pixel electrode part having a wedge shape and positioned between the first pixel electrode part and the second pixel electrode part, and the third pixel electrode part and the lower electrode form a storage capacitor.

17. The liquid crystal display panel of claim 15, wherein the common electrode further comprises a third common electrode part having a wedge shape, the third common electrode part corresponding to the gate lines and being positioned between the first common electrode part and the second common electrode part.

18. A liquid crystal display device comprising:
a liquid crystal display panel configured to display an image using light, the liquid crystal display panel comprising:
a first substrate comprising a first base substrate, a plurality of gate lines and a plurality of data lines disposed on the first base substrate and crossing each other, and a pixel electrode comprising a first pixel electrode part and a second pixel electrode part disposed on the first base substrate and inclined in a different direction from each other with respect to the gate lines;
a second substrate comprising a second base substrate and a common electrode, the common electrode including a first common electrode part and a second common electrode part being disposed on the second base substrate and being alternately positioned with the pixel electrode; and
a liquid crystal layer disposed between the first and second substrates; and
a backlight assembly configured to provide the light to the liquid crystal display panel,
wherein the first pixel electrode part includes a plurality of first extension portions extending to be inclined at a first angle with respect to the gate lines and a first connection portion connecting the first extension portions, the second pixel electrode part includes a plurality of second extension portions extending to be inclined at a second angle with respect to the gate lines and a second connection portion connecting the second extension portions, the first common electrode part includes a plurality of third extension portions extending to be inclined at the first angle with respect to the gate lines and a third connection portion connecting the third extension portions, the second common electrode part includes a plurality of fourth extension portions extending to be inclined at the second angle with respect to the gate lines and a fourth connection portion connecting the fourth extension portions, the first to fourth extension portions do not overlap with each other, and each of the first and second extension portions and each of the first and second connection portions have a linear shape.

19. A liquid crystal display panel having a plurality of pixels and a liquid crystal layer disposed between facing substrates, comprising:

a plurality of gate lines and data lines disposed on a first of said substrates;

a lower electrode formed between consecutive ones of said gate lines dividing each of said pixels into two areas;

a first pixel electrode part and a second pixel electrode part respective to each one of said two pixel areas, each said pixel electrode parts being inclined in a different direction with respect to the gate lines;

a third pixel electrode part covering at least a portion of the lower electrode to form a storage capacitor with said lower electrode; and a second substrate having a common electrode, wherein the first pixel electrode part includes a plurality of first extension portions extending to be inclined at a first angle with respect to the gate lines and a first connection portion connecting the first extension portions, the second pixel electrode part includes a plurality of second extension portions extending to be inclined at a second angle with respect to the gate lines and a second connection portion connecting the second extension portions, the first common electrode part includes a plurality of third extension portions extending to be inclined at the first angle with respect to the gate lines and a third connection portion connecting the third extension portions, the second common electrode part includes a plurality of fourth extension portions extending to be inclined at the second angle with respect to the gate lines and a fourth connection portion connecting the fourth extension portions, the first to fourth extension portions do not overlap with each other, and each of the first and second extension portions and each of the first and second connection portions have a linear shape.

20. A liquid crystal display panel according to claim 19, wherein the third pixel electrode part corresponding to the lower electrode includes an inclined portion at a first angle and another inclined portion at a second angle.

* * * * *